United States Patent [19]
Futrell et al.

[11] Patent Number: 6,048,016
[45] Date of Patent: Apr. 11, 2000

[54] VEHICLE WITH SLIDE-OUT ROOM

[75] Inventors: Steven D. Futrell; Jack M. Decker, both of Forest City, Iowa

[73] Assignee: Winnebago Industries, Inc., Forest City, Iowa

[21] Appl. No.: 09/123,057

[22] Filed: Jul. 27, 1998

Related U.S. Application Data

[62] Division of application No. 08/656,891, May 30, 1996, Pat. No. 5,785,373.
[60] Provisional application No. 60/009,468, Dec. 28, 1995.

[51] Int. Cl.[7] ....................................................... B62C 1/06
[52] U.S. Cl. ...................................... 296/26.13; 296/26.12; 296/165; 52/67
[58] Field of Search ............................... 296/26.12, 26.13, 296/165, 171, 172, 175, 176; 52/67

[56] References Cited

U.S. PATENT DOCUMENTS

| | | |
|---|---|---|
| Re. 32,262 | 10/1986 | Stewart . |
| 2,519,517 | 8/1950 | Tassel . |
| 3,106,750 | 10/1963 | Jarman .......................... 296/26.13 X |
| 4,312,159 | 1/1982 | Paul . |
| 5,050,927 | 9/1991 | Montanari . |
| 5,237,782 | 8/1993 | Cooper . |
| 5,398,986 | 3/1995 | Koob ............................... 296/26.13 X |
| 5,491,933 | 2/1996 | Miller et al. . |
| 5,511,459 | 4/1996 | Hanser et al. . |
| 5,628,541 | 5/1997 | Gardner . |
| 5,788,306 | 8/1998 | DiBiagio et al. ................ 296/26.13 X |
| 5,894,698 | 4/1999 | Dewald, Jr. et al. ............... 296/171 X |

FOREIGN PATENT DOCUMENTS

2001589  2/1979  United Kingdom .

*Primary Examiner*—Joseph D. Pape
*Attorney, Agent, or Firm*—Burd, Bartz & Gutenkauf

[57] ABSTRACT

A motor home has a slide-out room movable between extended and retracted positions with a slide-out assembly that supports the outside of the room. A longitudinal skid pad assembly supports the inside of the room on the floor of the motor home. Latches on the side walls of the motor home engage anchors secured to the floor of the motor homes to retain the room in the retracted position. Connectors having vertical and horizontal adjusting structures mount the room on the slide-out assembly to permit adjustment of the position of the room relative to the side wall and floor of the motor home.

9 Claims, 8 Drawing Sheets

VEHICLE WITH SLIDE-OUT ROOM

CROSS REFERENCE TO RELATED APPLICATION

This application is a division of U.S. application Ser. No. 08/656,891 filed May 30, 1996 now U.S. Pat. No. 5,785,373. application Ser. No. 08/656,891 is a continuation of provisional application Ser. No. 60/009,468 filed Dec. 28, 1995.

FIELD OF THE INVENTION

The invention relates to a room extension for a recreational vehicle to increase the usable interior space of the vehicle. More particularly, the room extension is a slide-out room incorporated in a motor home and movable to a retracted position so that the room is stored inside the motor home during transport and to an extended position upon reaching a desired designation.

BACKGROUND OF THE INVENTION

Recreational vehicles, such as travel trailers and motor homes, have dimensional limits to accommodate highway regulations. The interior space is restricted by the width of the vehicle. In order to increase the useable interior space of recreational vehicles, slide-out rooms have been added to the bodies of the vehicles. These rooms are retracted and stored in the interior of the vehicles during highway travel. When the vehicles are parked, the slide-out rooms are moved laterally of the vehicle's side walls to an extended position to increase the useable interior space of the vehicles. Rollers associated with the slide-out rooms are used to facilitate the lateral movement of the rooms relative to floors and side walls of the vehicles. The rollers create grooves and wear patterns in the floor carpets of the vehicles, which require premature repair and replacement. When the slide-out rooms are in the retracted positions, they must be secured to prevent movement during travel of the vehicle. Latches anchored to the side walls of the vehicles secure the slide-out rooms to the vehicles. These latches require the addition of substantial structure to the side walls to accommodate the additional forces created by the movable slide-out rooms. The latches in some vehicles are difficult to access and are inconvenient to use. The rooms are mounted on slide mechanisms attached to the frames of the vehicles. Power-operated units, such as hydraulic, pneumatic, electric, and gearing mechanisms are used to operate the slide mechanisms to extend and retract the slide-out rooms. During the construction of the vehicles, the slide-out rooms are adjusted to properly fit the side walls and rigidly secured to the slide mechanisms. The construction makes it difficult to readjust the fit of the slide-out room relative to the vehicle's side walls and floors as needed during the life of the vehicles. The recreational vehicles with the side-out room of the invention hereinafter described overcomes the disadvantages of the prior slide-out room structures.

Examples of recreational vehicles equipped with slide-out rooms are disclosed in U.S. Pat. Nos. 4,312,159; 4,500,132; and, 5,237,782. W. A. Paul, in U.S. Pat. No. 4,312,159, discloses a house trailer having a tip-out room hinged to one side wall of the trailer. When the room is in the out position, it is held on a hinge and room support. The room support has a first beam attached to the frame of the trailer and a second beam telescoped into the first beam. An adjustable post mounted on the outer end of the second beam retains the room in an adjusted horizontal position. C. T. Yoder, in U.S. Pat. No. 4,500,132, discloses a travel trailer with a slide-out room having a floor, side walls, end wall, and a roof. Movement of the slide-out room between its extended and retracted or travel positions is achieved with an electric motor connected through a gear box to telescopic extension members. The outside wall of the slide-out room is connected to the extension members. The connection includes vertically-adjustable bolt and nut assemblies to vertically position the slide-out room relative to the trailer side wall. D. R. Cooper, in U.S. Pat. No. 5,237,782, discloses a travel trailer with a slide-out room mounted on movable rails. The room and rails are laterally moved with a worm gear driven by an electric motor. The outside wall of the slide-out room has an outwardly-directed peripheral extension supporting a liquid-sealing assembly. The sealing assembly engages an adjacent portion of the trailer side wall to prevent water, snow, and air from flowing into the interior of the trailer when the slide-out room is in the retracted position.

SUMMARY OF THE INVENTION

The invention relates to improvements in slide-out rooms for recreational vehicles, such as motor homes, travel trailers, and mobile homes, to increase the usable interior space of the vehicle. The slide-out room has an outside wall, end walls, a floor, and a roof mounted on a slide mechanism operable to move the slide-out room between an extended or out position, and an in or retracted position. Flanges at the inner and outer peripheral edges of the slide-out room cooperate with a flexible seal that provides a weather-tight seal between the room and side wall of the vehicle when the room is in either the extended position or the retracted position. The flexible seal attached to the side wall of the vehicle has a continuous lip that engages the roof surfaces of the room to remove water and debris from the roof when the room is moved between the extended and retracted positions. The end walls when viewed from the front of the vehicle have a trapezoid shape which aids in making and retaining an effective seal between the room trim flange and the side wall of the vehicle. The seal along the top edge of the slide-out room and the main seal secured to the vehicle side wall first engages the vehicle side wall and slide-out room flange allowing the power mechanism to pull the bottom seal tight against the sidewall. The trapezoid shape of the side-out room end walls also holds the inside edge of the roof higher than the outer edge which gives the roof a slope outwardly and downwardly to facilitate the shedding of water. When viewed from the side of the vehicle, the end walls of the slide-out room are vertical and the roof has an additional crown that keeps the center of the roof higher than the outer edges further aiding in the shedding of water.

The inside edge of the slide-out room is supported by a skid pad assembly to prevent unnecessary loads of the side wall and wear on the carpet on the floor of the coach of the vehicle. An elongated longitudinal skid pad assembly is secured to the lower portion of the inside edge of the floor of the slide-out room. The skid pad assembly includes a low-friction skip pad or member extended the longitudinal length of the room that rests longitudinally on the floor of the coach. The skid pad provides a large bearing surface and spreads the load of the slide-out room over a substantial area to reduce the wear on the carpet and the floor. The skid pad has no moving parts and does not require maintenance in use.

The slide-out room is firmly secured to the coach floor with releasable latch mechanisms when it is in the retracted position while the vehicle to travel over the road. Other types latches and holding devices can be used to secure the slide-out room to the coach floor. The latch mechanisms include anchors that are secured to the floor of the coach to provide a substantial support for the anchor. The latch mechanisms have over center latching devices that are secured to the opposite end walls of the slide-out room. Each latch mechanism has an engaging member that connects with the anchor to secure the side wall to the coach floor. The latch mechanisms are located where they are readily accessible and can be observed to ensure that they are properly locked when the slide-out mechanism is in the retracted position.

The outer longitudinal edge of the slide-out room is mounted on a support carried by movable arms connected to a power mechanism operable to move the arms and room between an extended position and a retracted position. The arms are attached to the support with adjustable connectors used to longitudinally and vertically and laterally adjust the position of the slide-out room relative to the side wall of the vehicle. The adjustable connectors are used during the manufacture of the vehicle to obtain a quality product and, subsequently, as a service option to keep the slide-out room in alignment with the side wall of the vehicle during the lifetime of the vehicle. The adjustable connectors have threaded devices operable to raise, lower, tilt, and longitudinally move the slide-out room relative to the side wall of the recreational vehicle.

DESCRIPTION OF THE PREFERRED EMBODIMENT

Figure 1:
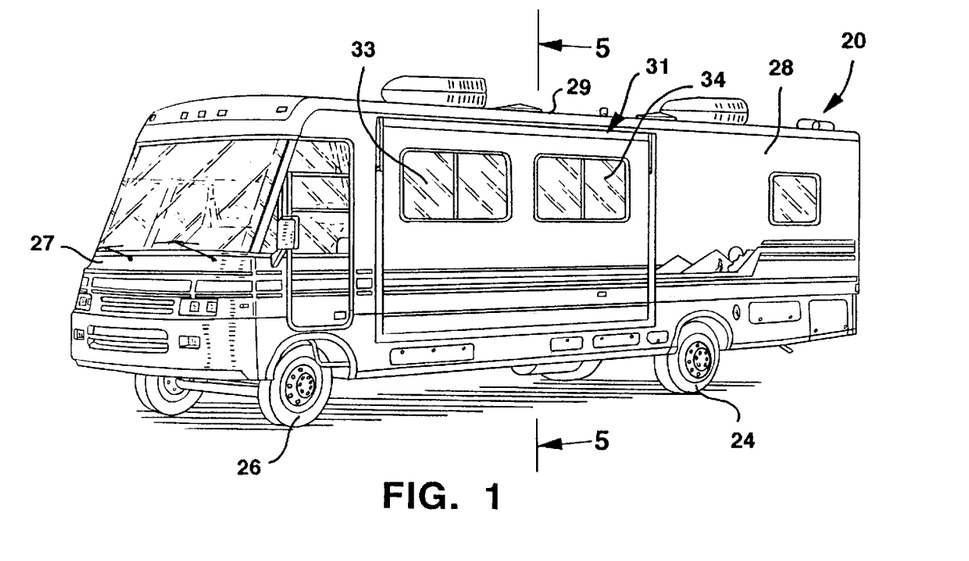
FIG. 1 is a perspective view of a motor home having the slide-out room of the invention located in the travel or retracted position.
Figure 2:
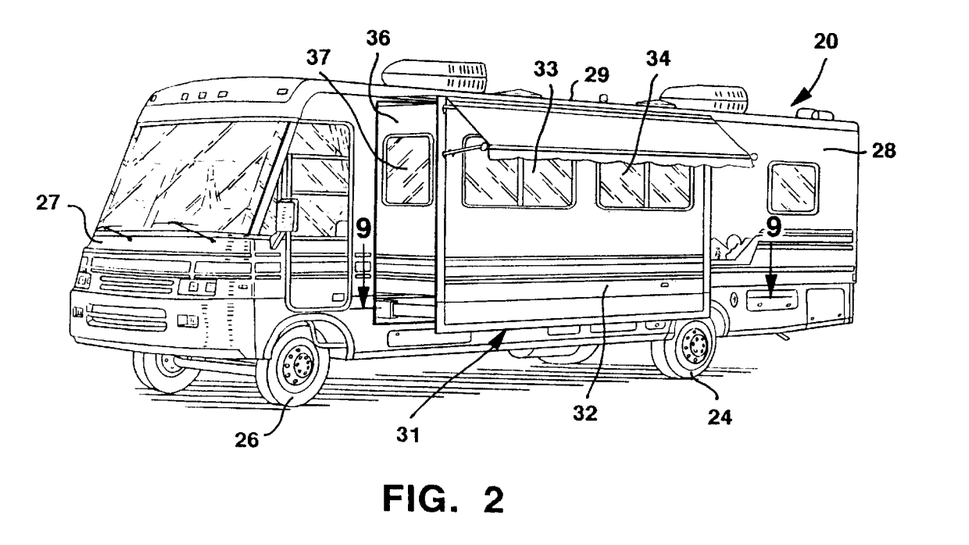
FIG. 2 is a perspective view of the motor home of FIG. 1 with the slide-out room in the out or extended position.

Referring to FIGS. 1 and 2, there is shown a recreational vehicle indicated generally at 20, commonly known as a motor home. Vehicle 20 has a chassis 21 including longitudinal frame members 22 and 23 shown in FIG. 9. Vehicle 20 has a rear and front wheels 24 and 26, and a front cowl 27 extended downwardly from the windshield and driver compartment. The coach of the vehicle has a generally vertical longitudinal side wall 28 joined to a top member or roof 29.

Figure 3:
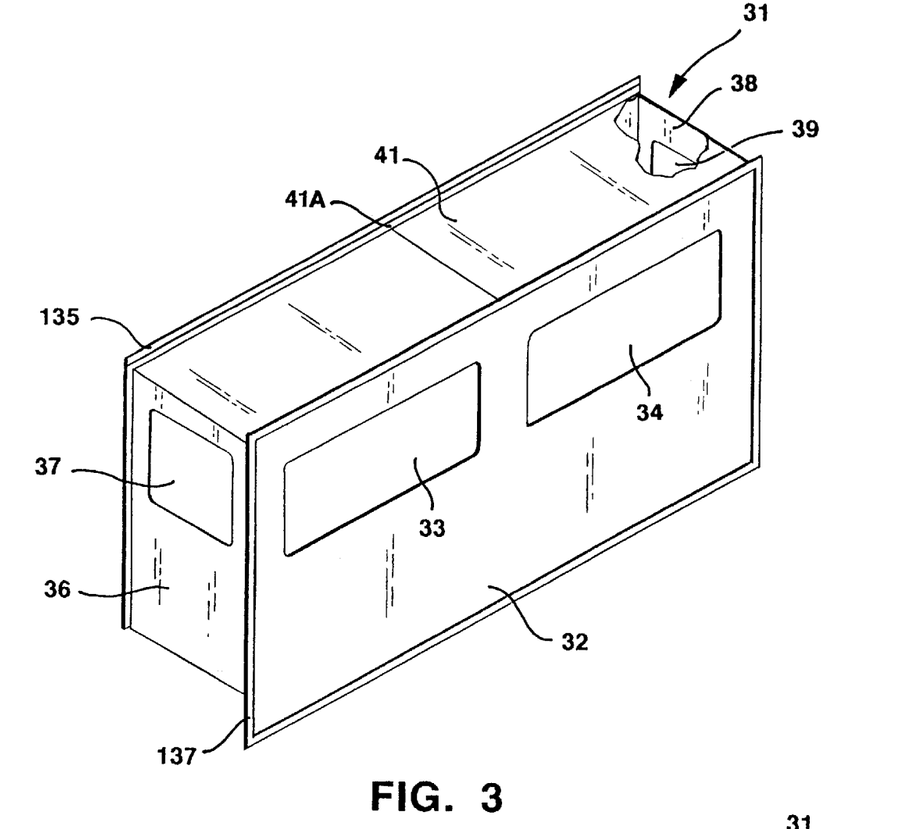
FIG. 3 is a perspective view of the slide-out room detached from the motor home.
Figure 4:
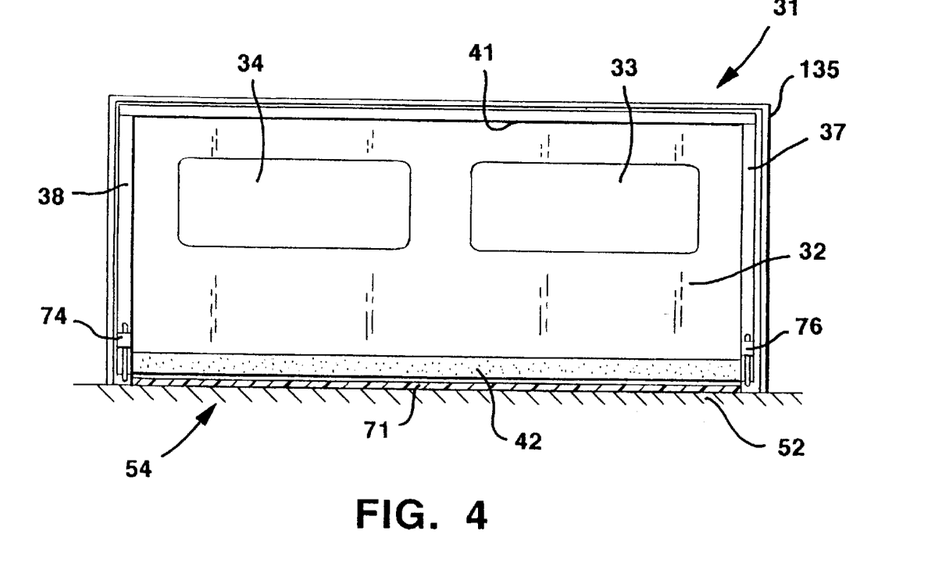
FIG. 4 is an inside elevational view of the slide-out room of FIG. 3.

A slide-out room, indicated generally at 31, is incorporated in the vehicle side wall 28, which has a rectangular opening for accommodating the room. Slide-out room 31 can be used with other types of vehicles and structures, including, but not limited to, travel trailers, trailers, mobile homes, cabins, and fish houses. As shown in FIGS. 3 and 4, slide-out room 31 has a longitudinal generally vertical outside wall 32 having a pair of windows 33 and 34 joined to front end wall 36 having window 37 and rear end wall 38 having window 39. Windows 33 and 34 can be omitted from the end walls 36 and 38. Side wall 32 and end walls 36 and 38 are joined to a generally horizontal top wall 41. The bottom of slide-out room 31 has a generally horizontal floor 42 which is shown in detail in FIG. 5.

Figures 5, 6:
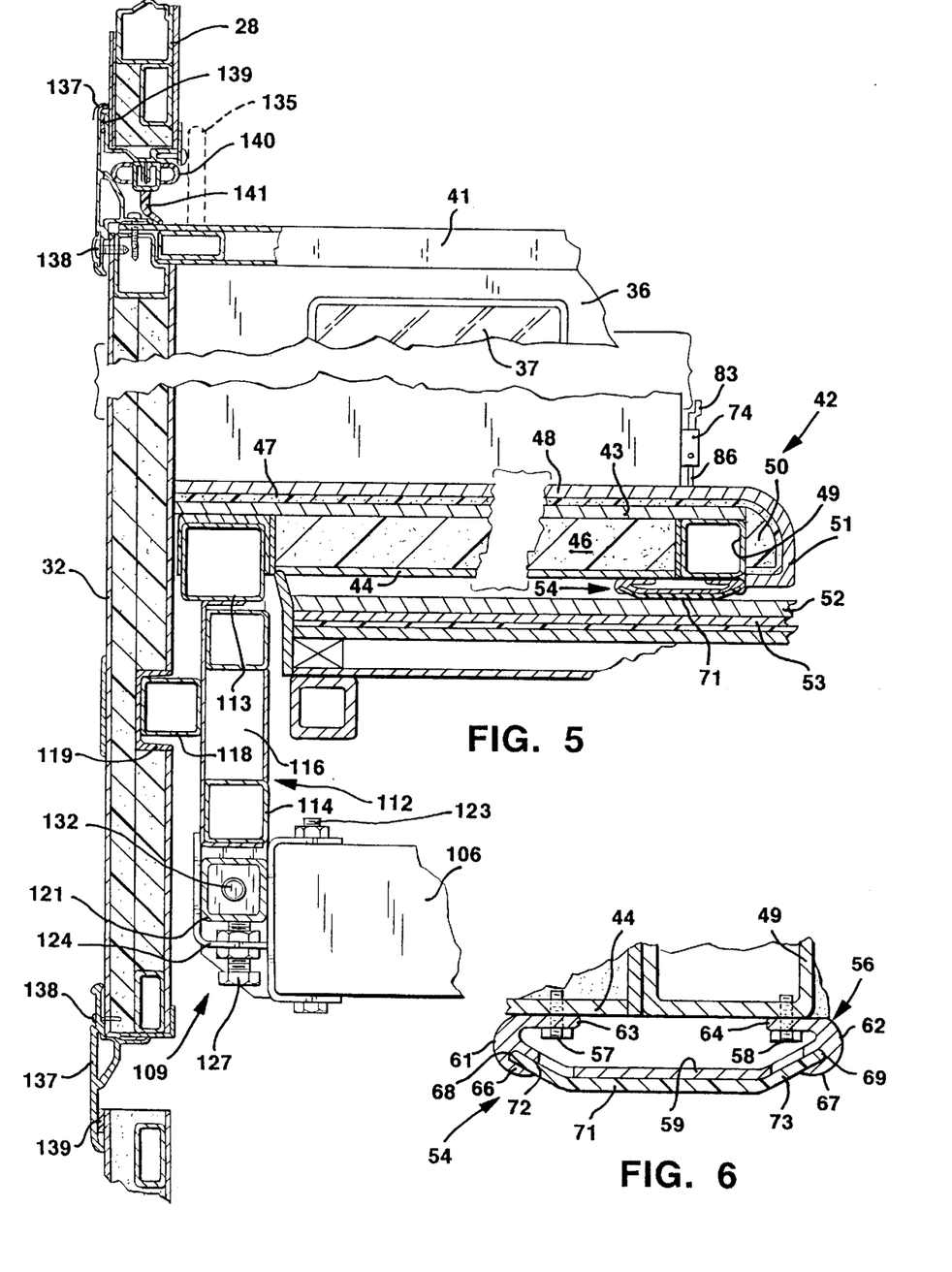
FIG. 5 is an enlarged fragmentary sectional view taken along the line 5—5 of FIG. 1.
FIG. 6 is an enlarged sectional view of the slide-out room skid pad assembly of FIG. 5.

Floor 42 has a generally horizontal floor board 43 and a bottom panel 44. A core of foam plastic 46 is located between floor board 43 and panel 44. Floor board 43 is covered with a foam pad 47 that supports a carpet 48. Floor board 43 extends over a longitudinal front box beam 49. The front section 51 of carpet 48 and pad 47 extends over a block 50 to provide the front edge of the slide-out room floor 42. Coach floor 53 is covered with a carpet 52 that is located below slide-out room floor 42.

Figure 3A:
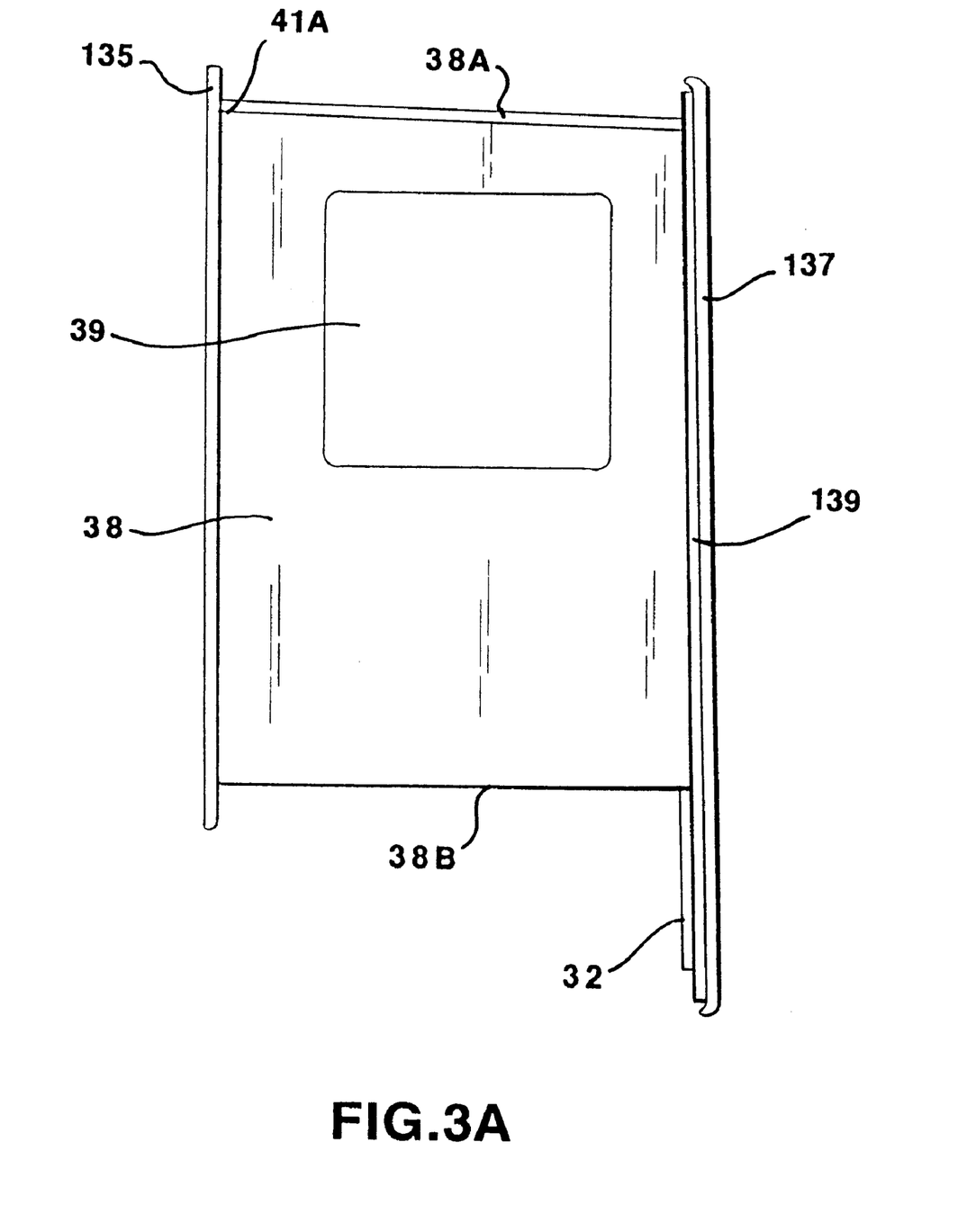
FIG. 3A is an enlarged end elevational view of the slide-out room.

Room 31 has a shape that facilitates a weather-tight seal along the side wall and roof, and repels water from the roof. The slide-out room has a generally trapezoidal shape that is narrower at the top than at the bottom and sloped downward to the outside across the top. The shape of room 31 insures that the top of the room contacts the upper section of seal 140 first when room 31 is in the retracted position. As shown in FIG. 3A, and wall 38 has a trapezoid shape with a top edge 38A being shorter than the bottom edge 38B. The seal 139 is secured to and extends around trim plane 137. The end wall 36 has the same trapezoid shape as the end wall 38. The trapezoid shape of end walls 36 and 38 aids in making and retaining an effective seal 140 between flange 137 and the side wall 28 of the vehicle. The seal 139 and 140 along the top portion of the side wall 28 is first engaged during the closing of the slide-out room. The power mechanism pulls the bottom seal tight against the lower portion of the side wall 28 of the vehicle. The trapezoid shape of end walls 36 and 38 locates the inside edge 41A of roof 41 higher than the outer edge thereby providing roof 41 with an outwardly and downwardly directed slope to facilitate the shedding of water. Roof 41 also has a crown that keeps the center of the roof 41 higher than its outer edges. This further aids in shedding water off roof 41. The force of slide-out assembly 97 is applied at the bottom of the room where it is adequate to compress the seal along the bottom and sides of the vehicle. The deflections in the walls of the room reduce the force needed to compress the top of seal 140. The shape of room 31 compensates for its deflection. Roof 41, along its inside edge, has an upward bow lengthwise along roof 41. The high spot 41A on roof 41 is the inside center which sheds water toward the outside corners of the roof. The water drains away from seal 140. This improves the ability of seal 140 to prevent water, snow and air from entering the interior of the vehicle.

The front longitudinal edge of floor 42 is slidably supported on carpet 52 with a skid pad assembly, indicated generally at 54. As shown in FIG. 4, skid pad assembly 54 extends along the entire longitudinal length of room 31. As shown in FIG. 6, skid pad assembly 54 is connected to bottom panel 44 and box beam 49 with fasteners 57 and 58, such as bolts or screws. Carrier 56 has a longitudinal generally flat base 59 and opposite upwardly and outwardly-extended side members 61 and 62. Carrier 56 is a one-piece extruded metal member. Side members 61 and 62 have inwardly-directed flanges 63 and 64 that bear against the bottom panel 44 and box beam 49. Side member 61 has a downwardly and inwardly-extended ear 66 forming a longitudinal groove 68. Opposite side member 62 has a downwardly and inwardly-extended ear 67 forming a longitudinal groove 69. Grooves 68 and 69 are parallel to each other and extend the length of carrier 56.

A pad 71 of low friction plastic material, such as polyethylene, covers the bottom of base 59. Pad 71 has opposite edge portions 72 and 73 that fit into grooves 68 and 69 to retain pad 71 on carrier 56. Pad 71 is initially a flat elongated plastic sheet. Edge portions 72 and 73 are flexed into grooves 68 and 69 to provide front and rear bevel surfaces to facilitate the sliding of pad 71 on coach floor carpet 52. Skid pad assembly 54 can have other longitudinal structures for supporting the inside longitudinal portion of slide-out room on the floor 42 of the coach. Skid pad assembly 54 can be a one-piece plastic extrusion, a formed metal plate or a plastic wrapped wood member. Pad 71 glides over carpet 52 providing a large bearing area to distribute the slide-out room's weight on coach floor carpet 52. Skid pad assembly 54 does not have any moving parts that will need maintenance or wear out. The large bearing surface on the bottom of pad 71 that engages carpet 52, reduces the force per square centimeter to a level that will not wear out the carpet or plastic pad 71 over a substantial period of time.

Figure 7:
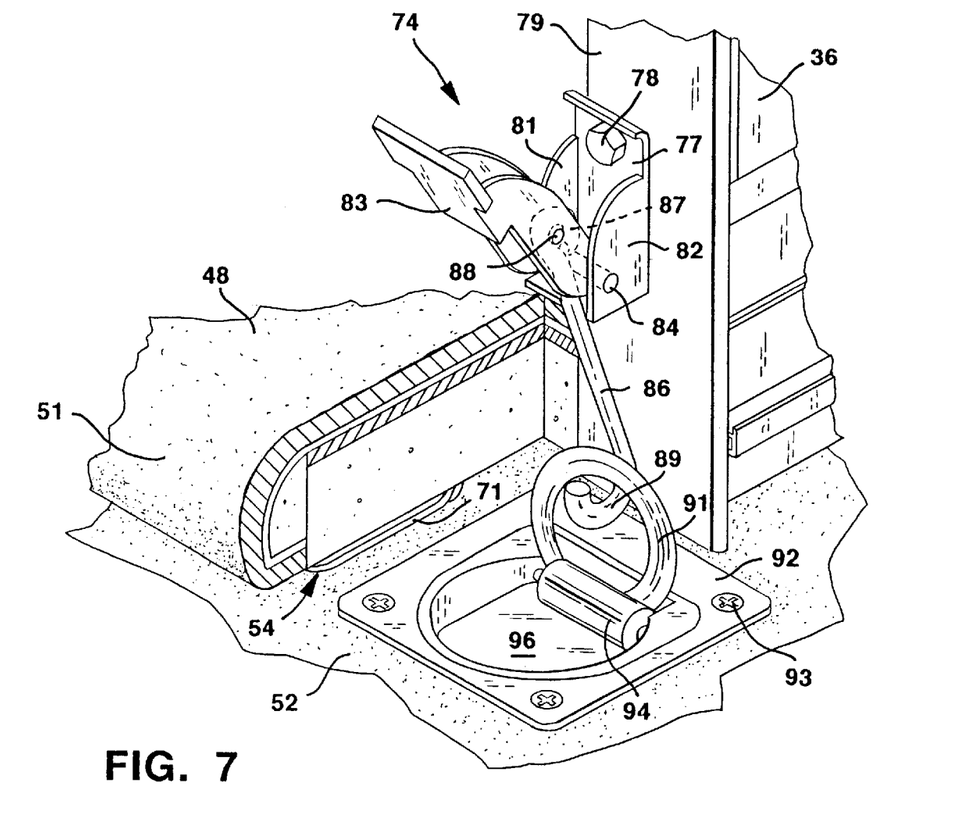
FIG. 7 is a perspective view of the latch assembly securing the slide-out room to the coach floor.

Latch mechanisms, indicated generally at 74 and 76 at each end of slide-out room 31, are used to keep the room from shifting while the vehicle is moving. Latch mechanisms 74 and 76 are identical. The following description is directed to latch mechanism 74, as seen in FIG. 7. Other types of latching devices can be used to attach side-out room 31 to the floor 42 of the coach as the floor has substantial structural support.

Figure 8:
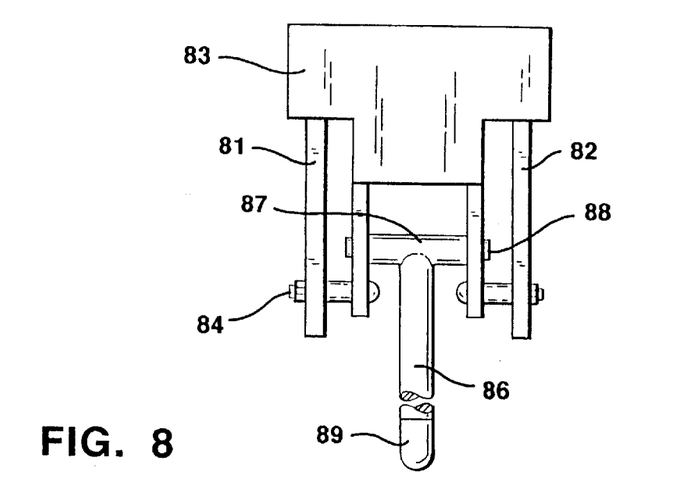
FIG. 8 is a front elevational view of the latch assembly of FIG. 7.

Latch mechanism 74 has a generally U-shaped bracket 77 secured to the inside edge 79 of side wall 36 of slide-out room 31. Bracket 77 has outwardly-directed side flanges 81 and 82 providing a space for accommodating a pivoting arm 83. The lower portion of arm 83 is connected with a transverse pivot pin 84 to side flanges 81 and 82. Rod 86 is pivotally connected to arm 83 and extends downwardly toward the coach floor. Rod 86 is connected to an eye or cross tube 87 accommodating a pin 88 that pivotally connects the rod to arm 83, as seen in FIG. 8. Rod 86 can be adjusted relative to eye 87 to adjust the holding force of latch mechanism 74. The lower end of rod 86 is turned into an upwardly-open hook 89. Hook 89 is adapted to engage a ring 91 mounted on a support 92. As seen in FIG. 7, support 92 is a generally rectangular member that is attached with fasteners 93 to the coach floor. Ring 91 is connected to a pivot member 94 that is pivotally connected to support 92 within a recess 96. Ring 91 can be pivoted downwardly into recess 96 so that it is flush with the floor. Latch mechanisms 74 and 76 are located for easy access and operation, as well as visual inspection. Latch mechanisms 74 and 76 operate in a manner to hold the slide-out room tight against side wall 28 of the motor home and seal 140 to prevent it from shifting and moving laterally of wall 28 and seal 140 during vehicle travel. If slide-out room 31 shifts during transport, it can produce air leaks around the peripheral edge of the room. Latch mechanisms 74 and 76 must be disengaged from ring 91 before slide-out room 31 is extended. The main floor of the coach and its sub-structure provides a strong foundation for support 92 without the need for additional structure. In the release or unsecured position, ring 91 fits in recess 96 and is flush with the floor so that it does not become an obstacle in the coach floor. When arm 83 is moved to its full up position, pin 88 is in an over center position relative to pin 84. Hook 89 is in tight engagement with ring 91 so as to firmly hold slide-out room 31 in the in or transport position and holds pad 71 in firm engagement with coach floor carpet 52.

Figures 9, 10:
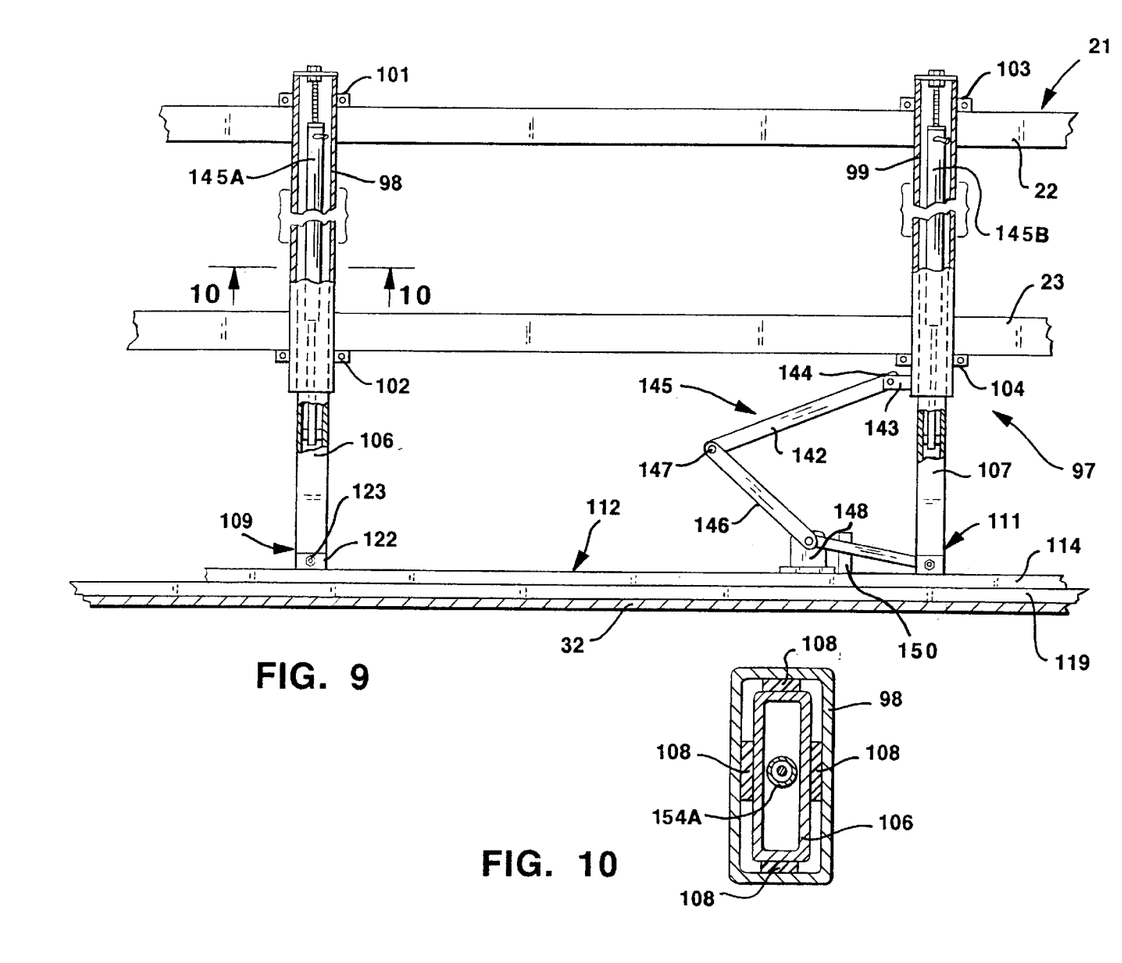
FIG. 9 is an enlarged sectional view taken along the line 9—9 of FIG. 2.
FIG. 10 is an enlarged sectional view taken along the line 10—10 of FIG. 9.
Figure 11:
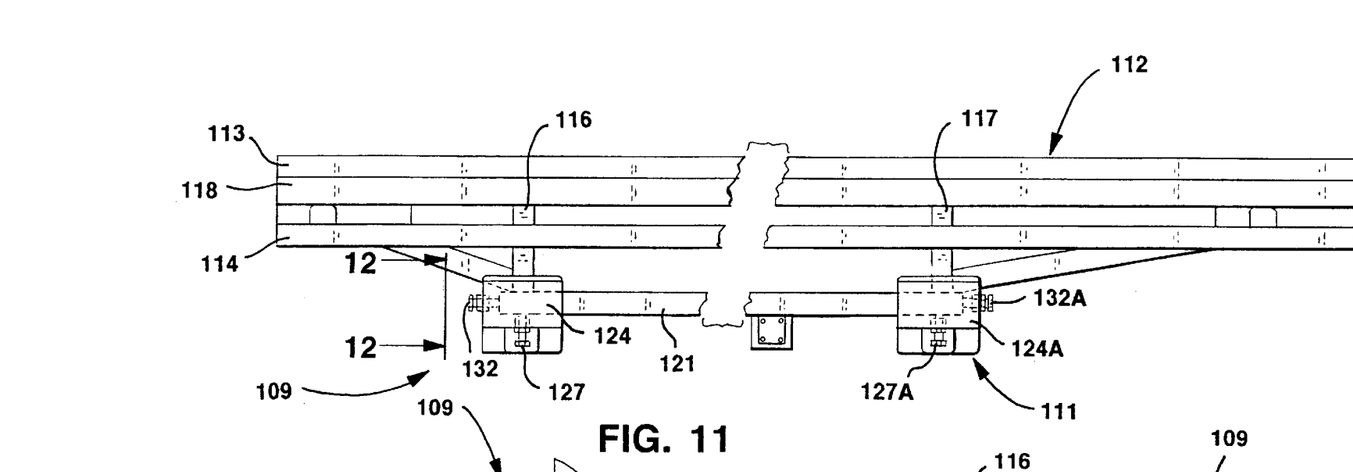
FIG. 11 is a fragmentary front elevational view of the slide-out room support frame and adjusting bracket assemblies.
Figure 12:
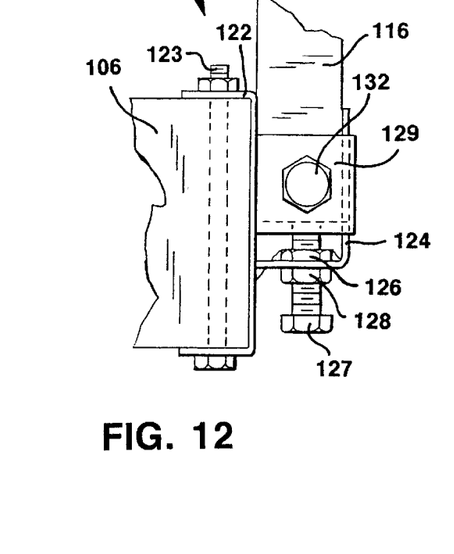
FIG. 12 is an end elevational view taken along the line 12—12 of FIG. 11.
Figure 13:
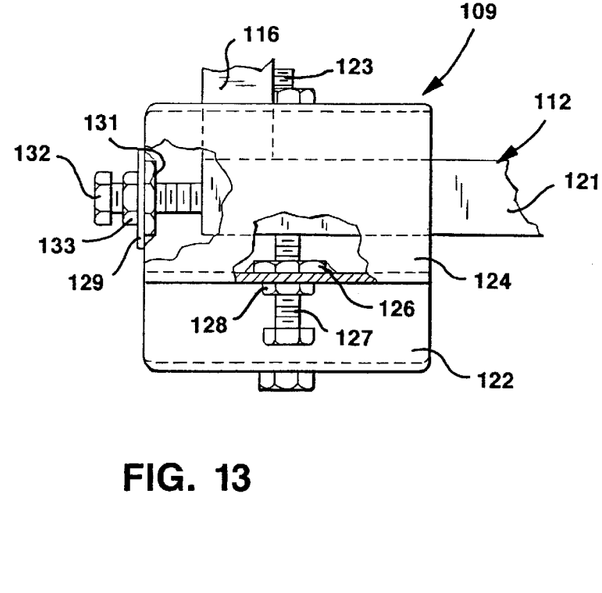
FIG. 13 is a side elevational view partly broken away of the adjusting mount assembly for the slide-out room carrier frame.

Referring to FIG. 9, there is shown the slide-out assembly, indicated generally at 97, that connects slide-out room 31 to longitudinal frame members 22 and 23 of the vehicle. An example of slide out assembly 97 is disclosed in U.S. Pat. No. 5,511,459. Slide-out assembly 97 has a pair of longitudinally-spaced cross box beams 98 and 99 mounted on frame members 22 and 23 with a plurality of fasteners 101, 102, 103 and 104. Beams 98 and 99 are located below coach floor 53. Arms 106 and 107 are slidable mounted within cross beams 98 and 99. As shown in FIG. 10, arm 106 telescopes into box beam 98 and is slidably mounted on a plurality of pads 108 to facilitate the linear movement of arm 106 between its in and out position relative to cross beam 98. Arm 107 is slidably mounted in cross beam 99 with the same structure as shown in FIG. 10. The outer ends of arms 106 and 107 are attached to connector assemblies 109 and 111 which support the longitudinal room frame, indicated generally at 112. Room frame 112, as seen in FIG. 11, comprises a pair of linear longitudinal frame members 113 and 114 secured to upright posts 116 and 117. A longitudinal beam 118 is joined to posts 116 and 117 and projects outwardly therefrom. As seen in FIG. 5, beam 118 nests within channel member 119 to vertically support side wall 32. Frame 112 has a longitudinal bottom beam 121 secured to the bottom of posts 116 and 117. Connectors 109 and 111 are identical in structure and function. The following description is directed to connector 109. As seen in FIGS. 12 and 13, connector 109 has a first generally U-shaped member 122 attached to the outer end of arm 106 with a generally vertical member, such as a pin or bolt 123. A second U-shaped member 124 accommodates bottom beam 121 and post 116. The base or bottom of U-shaped member 124 has a nut or threaded member 126 that accommodates a generally upright bolt 127. A jam nut 128 threaded on bolt 127 retains bolt 127 in a selected adjusted position. Bolt 127 and bolts 127A of connector assembly 111 are used to vertically adjust the elevation and tilt the horizontal alignment of room 31 relative to side wall 28 of the vehicle.

A plate 129 is secured to member 122 and the outer ends of U-shaped member 124 adjacent the end of bottom beam 121. A nut 131 secured to plate 129 accommodates a horizontal threaded bolt 132. A jam nut 133 threaded on bolt 132 holds it in an adjusted position. Bolt 132 is longitudinally oriented and engages the end of bottom beam 121. Bolts 132 and 132A are used to longitudinally adjust the position of room frame 112 relative to the vehicle side wall 28 so as to longitudinally locate slide-out room 31 in the opening in wall 28. As shown in FIGS. 5 and 12, connector 109 is mounted on the end of arm 106 with member 122 and bolt 123.

Figure 14:
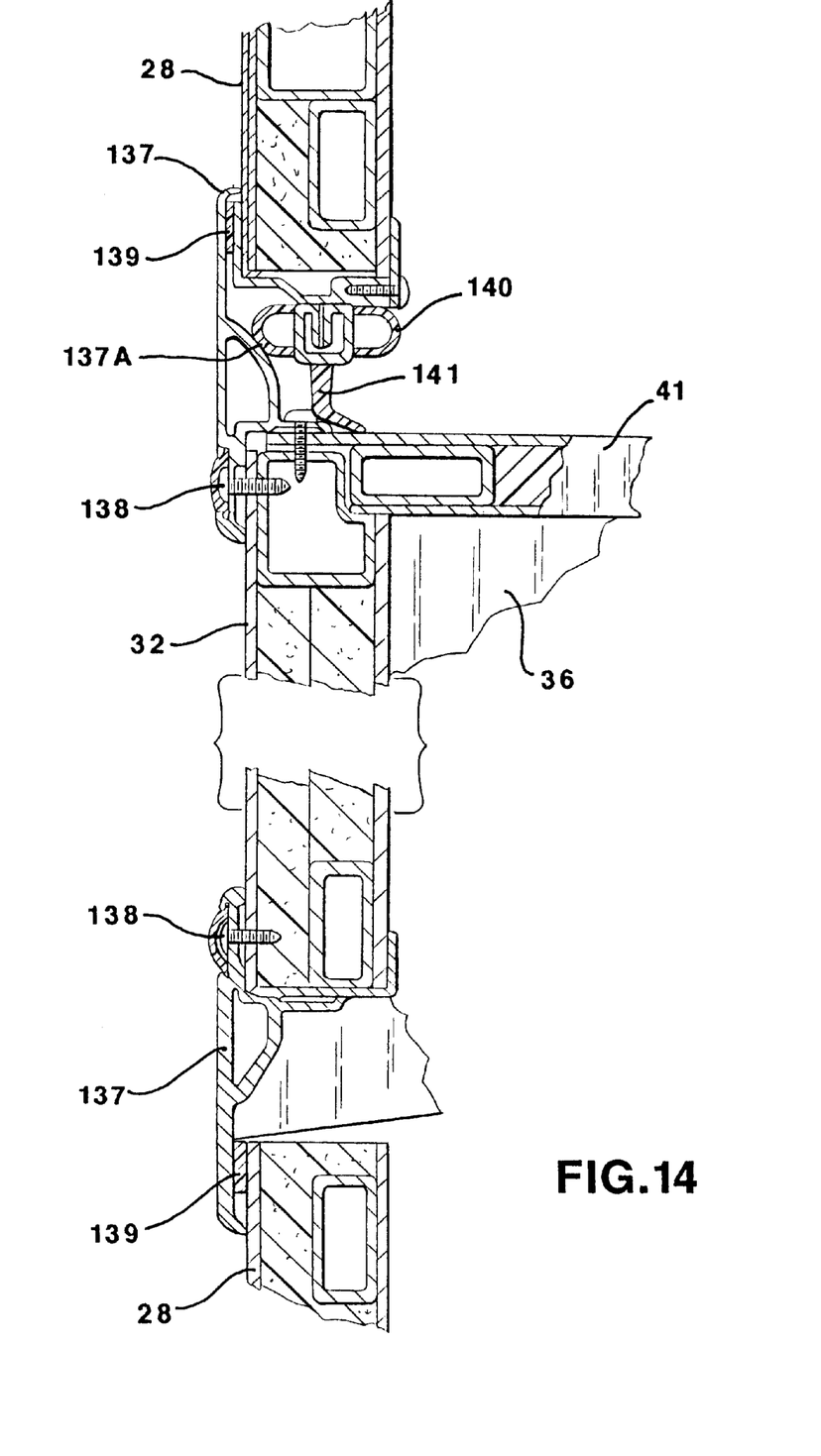
FIG. 14 is an enlarged fragmentary sectional view showing the side-out room and the vehicle side wall.

As shown in FIGS. 5 and 14, the outer peripheral edge of side wall 32 of room 31 is connected to an outwardly-directed trim flange 137 that extends over the adjacent side wall portions of the motor home surrounding the opening. A seal 139 is secured to the inside of flange 137 and engages side wall 28 when the room 31 is in the retracted position. Seal 139 forms a weather-tight joint between flange 137 and the adjacent side wall of the motor home to keep dust, dirt, snow and water from flow post flange 137 to seal 140. Seal 139 reduces wind noise during travel of the vehicle. Seal 139 can be made of a flexible water-resistant tubular material, such as EPDM rubber. A second main seal 140, mounted on side wall 28, functions to seal room 31 with side wall 28 when it is in the retracted and extended positions. The inside sealing surfaces 137A of flange 137 and seal 140 contact each other to prevent air and water leakage into the interior of the motor home and room. Seal 140, shown in FIG. 5, has an oblong tubular shape with opposite ends projected laterally of the adjacent inside and outside surfaces of wall 28. Seal 140 has a width about the same as the width of wall 28. When room 31 is in the retracted position, flange surface 137A engages the outer edge of seal 140. As shown in broken lines in FIG. 5, when room 31 is in the extended position, flange 135 engages the inner end of seal 140. Seal 140 has an inwardly-directed flexible extension or leg 141 that contacts the flat outside surfaces of top wall 41 as well as end walls 36 and 38 of room 31 to bridge the gap between the motor home side wall 28 and room 31. Extension 141 is a generally flat continuous flange having a linear lower edge that contacts the adjacent wall surfaces of room 31. Extension 141 also serves to wipe debris and water which has fallen or been wind-blown onto the exterior room surfaces and prevent the water and debris from entering the interior of the motor home. Flange 137 conceals seal 140 and extension 141 from view when slide-out room 31 is in the retracted position. This protects the seal from direct contact with external weather further aiding in weather-tight sealing characteristics. Protecting seals 139, 140 and 141 from the environmental elements extends their life and reduces maintenance. Seals 139 and 140 prevent wind from entering the room and vehicle interface while the room is retracted and in the vehicle is in motion. If the wind enters the interface, noise can be a negative result. Wind noise can detract the driver or impede normal conversation within the motor home and give the user the impression of poor quality.

Returning to FIG. 9, a power mechanism comprising hydraulic cylinders 145A and 145B operate to move room frame 112 between its in or retracted position and the out position, as shown in FIG. 9 and thereby move room 31 between its extended and retracted position. Hydraulic cylinders 145A and 145B located within cross beams 98 and 99 are connected to arms 106 and 107 and a source of hydraulic fluid under pressure. A control valve 150 mounted on an arm 148 supported on arm 107 operates to control the flow of hydraulic fluid to cylinders 145A and 145B. The hydraulic fluid carrying lines are located within tubular members 142 and 146. A pivot pin 147 connects adjacent ends of members 142 and 146. Member 142 is connected with a pin 144 to an ear 143 secured to beam 99. Electric-driven gear head motors or other structures used to move arms 106 and 107 relative to beams 98 and 99. Other mechanisms, such as linear actuators can be used as a power mechanism to move room frame 112 along with room 31 between its extended and retracted positions. The controls for power mechanism are normally located in the driver's compartment or interior of the vehicle so that the procedures of the operator for extending and retracting the slide-out room are completed after the latch mechanisms are released.

Modifications of structures and arrangement of structures of the invention can be made by one skilled in the art without departing from the invention. The invention is defined in the following claims.

We claim:

1. A slide out room and a vehicle having an interior space, a vertical wall with an opening in communication with the interior space, and a floor adjacent the opening, said slide out room having an outside wall, end walls, a floor, a roof, and an inside portion having an opening for providing an interior space, said roof includes a longitudinal portion, middle section, a transverse crown located at the middle section of the longitudinal portion of the roof, and roof portions on opposite sides of the crown sloping downwardly and outwardly away from the crown, each of said end walls having a generally trapezoid shape with a bottom horizontal width being larger than a top horizontal width, the outside wall of the room being secured to the roof and end walls whereby the outside wall is inclined upwardly and inwardly relative to the vertical wall of the vehicle, said outside wall having a peripheral flange extended adjacent the vertical wall of the vehicle when the room is in a retracted position in the interior space of the vehicle, said flange having an upper section across the top of the opening in the side wall of the vehicle and a lower section below the opening in the side wall of the vehicle, seal means located between the flange and the vertical wall of the vehicle for closing the opening between the room and wall of the vehicle, first means connected to the vehicle for supporting the room on the vehicle with the end walls, floor, and roof of the room located in the opening, and the open portion open to the interior space of the vehicle, and second means connected to the first means for selectively moving the room to an extended position outwardly from the vertical wall of the vehicle and a retracted position whereby when the room is moved from the extended position to the retracted position the seal means between the vertical wall and the upper section of the flange adjacent the crown first engages the wall of the vehicle and then progressively engages the wall of the vehicle before the seal means between the vertical wall and the lower section of the flange engages the wall of the vehicle so that the second means holds the entire seal means in firm engagement with the wall of the vehicle.

2. The room and vehicle of claim 1 including: a second seal means mounted on the wall of the vehicle adjacent the opening in said wall, said peripheral flange being engageable with said second seal means when the room is in the retracted position, and said room having an inner peripheral flange engageable with said second seal means when the room is in the extended position.

3. The slide out room and vehicle of claim 2 wherein: the second seal means includes an inwardly directed extension engageable with the roof to remove water and debris from the roof during movement of the room to the retracted position.

4. The slide out room and vehicle of claim 1 said seal means is mounted on the flange, said seal means adjacent the vertical wall above the opening and a lower portion adjacent a lower portion of the vertical wall below the opening, said upper portion of the seal means being engageable with the upper portion of the vertical wall before the lower portion of the seal means is engageable with the lower portion of the vertical wall during movement of the room to the retracted position.

5. A slide out room and a vehicle having an interior space, a wall with an opening in communication with the interior space, and a floor adjacent the opening, said slide out room having an outside wall including upper and lower portions, end walls, a floor, a roof having a longitudinal portion and a middle section, and an inside portion having an opening for providing an interior space each of said end walls having a generally trapezoid shape with a bottom horizontal width being larger than a top horizontal width, the outside wall of the room being secured to the roof and end walls whereby the outside wall is inclined upwardly and inwardly, and said roof slopes downwardly and outwardly, first means connected to the vehicle for supporting the room on the vehicle with the end walls, floor, and roof located in the opening, and the open portion open to the interior space of the vehicle, and second means connected to the first means for selectively moving the room to an extended position outwardly of the vertical wall of the vehicle and a retracted position whereby when the room is moved from the extend position to the retracted position the upper portion of the outside wall engages the wall of the vehicle before the lower portion of the outside wall of the room engages the wall of the vehicle.

6. The slide-out room and of vehicle claim 5 wherein: said roof has a transverse crown located at the mid-section of the longitudinal portion of the roof.

7. The slide out room and vehicle of claim 5 including: a first seal means mounted on the outside wall of the room engageable with the wall of the vehicle around the opening in said wall of the vehicle.

8. The slide out room and vehicle of claim 7 includes: a second seal means having an inwardly directed extension engageable with the roof to remove water and debris from the roof during movement of the room to the retracted position.

9. The slide out room and vehicle of claim 7 wherein: said room includes a peripheral flange extended adjacent the wall of the vehicle, said first seal means mounted on the flange includes an upper portion extended across the roof of the room and a lower portion adjacent the lower portion of the room, said upper portion of the second seal means being engageable with the wall of the vehicle before the lower position of the second seal means engages the wall of the vehicle during movement of the room to the retracted position.

* * * * *